(12) United States Patent
Miller et al.

(10) Patent No.: US 8,396,819 B2
(45) Date of Patent: Mar. 12, 2013

(54) UNIQUE INTERFACE IN SERVICE ORIENTED ARCHITECTURE

(75) Inventors: Steven G. Miller, Highland Village, TX (US); Lance W. Wilborn, Grand Prairie, TX (US); Dennis Wood, Dallas, TX (US)

(73) Assignee: Lockheed Martin Corp, Bethesda, MD (US)

( * ) Notice: Subject to any disclaimer, the term of this patent is extended or adjusted under 35 U.S.C. 154(b) by 595 days.

(21) Appl. No.: 12/563,778

(22) Filed: Sep. 21, 2009

(65) Prior Publication Data

US 2010/0082519 A1 Apr. 1, 2010

Related U.S. Application Data

(60) Provisional application No. 61/101,566, filed on Sep. 30, 2008.

(51) Int. Cl.
*G06F 17/00* (2006.01)
*G06F 7/04* (2006.01)
*G06F 7/00* (2006.01)
*G06F 15/16* (2006.01)

(52) U.S. Cl. ............... 706/47; 726/2; 726/26; 707/705; 709/217

(58) Field of Classification Search .................. None
See application file for complete search history.

(56) References Cited

U.S. PATENT DOCUMENTS

| | | | |
|---|---|---|---|
| 7,100,195 B1 * | 8/2006 | Underwood | 726/2 |
| 7,523,172 B2 * | 4/2009 | Mouhanna et al. | 709/217 |
| 2007/0101435 A1 * | 5/2007 | Konanka et al. | 726/27 |
| 2007/0180493 A1 * | 8/2007 | Croft et al. | 726/2 |
| 2007/0245409 A1 * | 10/2007 | Harris et al. | 726/5 |
| 2008/0060061 A1 * | 3/2008 | Deshpande et al. | 726/5 |

* cited by examiner

*Primary Examiner* — Alan Chen
(74) *Attorney, Agent, or Firm* — Lee, Jorgensen, Pyle & Kewalramani, P.C.

(57) ABSTRACT

A service architected logistics solution generates a user interface to a computing system unique for a given user among a multiplicity of users. The interface includes a plurality of services and access to data sources automatically determined from the user's identity. In various aspects, the technique includes not only the interface, but also a computer-implemented method, a program storage medium encoded with instruction that perform such a method when executed, and a computing apparatus programmed to perform such a method.

48 Claims, 4 Drawing Sheets

UNIQUE INTERFACE IN SERVICE ORIENTED ARCHITECTURE

CROSS-REFERENCE TO RELATED APPLICATIONS

The priority of U.S. Provisional Application Ser. No. 61/101,566, entitled OASAS, and filed Sep. 30, 2008 in the name of the inventors Steven G. Miller, et al., is hereby claimed under 35 U.S.C. §119(e). This application is also hereby incorporated by reference for all purposes as if set forth verbatim herein.

STATEMENT REGARDING FEDERALLY SPONSORED RESEARCH OR DEVELOPMENT

Not applicable.

BACKGROUND OF THE INVENTION

Description of the Related Art

This section of this document is intended to introduce various aspects of the art that may be related to aspects of the present invention described and/or claimed below. This section provides background information to facilitate a better understanding of the various aspects of the present invention. As the section's title implies, this is a discussion of related art. That such art is "related" in no way implies that it is also "prior art". The related art may or may not be prior art. It should therefore be understood that the statements in this section of this document are to be read in this light, and not as admissions of prior art.

The United States Army's Single Army Logistics Enterprise ("SALE") initiative consists of a service architecture defined as the Logistics Modernization Program ("LMP"). Once all depot operations have waved onto this program, all current and future product sustainment operations will be required to interface to the LMP and link with the SALE initiative. There are presently a number of good logistic systems and capabilities in place. However, none have the capabilities required to sustain operations within a service architected solution sufficient to link with and integrate to the LMP.

The present invention is directed to resolving, or at least reducing, one or all of the problems mentioned above.

SUMMARY OF THE INVENTION

A service architected logistics solution is presented that generates a user interface to a computing system unique for a given user among a multiplicity of users. The interface includes a plurality of services and access to data sources automatically determined from the user's identity. In various aspects, the technique includes not only the interface, but also a computer-implemented method, a program storage medium encoded with instruction that perform such a method when executed, and a computing apparatus programmed to perform such a method.

In a first aspect, the invention includes an interface between a data tier and a client tier of a computing system, comprising an interface component; and a set of services associated with a data source, the services and data source being automatically determined from the identity of a user of the client.

In a second aspect, the invention includes a computer-implemented method for interfacing a data tier and a client tier of a computing system, comprising: identifying the user of a client; automatically determining from the user identity a data source and a set of services associated with the data source; and associating the client with the automatically determined data source and services.

In a third aspect, the invention includes a computer-readable, program storage device encoded with instructions that, when executed by a processor, perform a method for interfacing a data tier and a client tier of a computing system. The method comprising: identifying the user of a client; automatically determining from the user identity a data source and a set of services associated with the data source; and associating the client with the automatically determined data source and services.

In a fourth aspect, the invention includes a computing system, comprising: a processor; a bus system; and a storage. On the storage resides: a client that may communicate over the bus system; a plurality of data sources accessible over the bus system; a plurality of services that may be invoked and operate over the bus system; and an interface software component. The interface software component, when invoked by the processor over the bus system, performs a method including: identifying the user of a client; automatically determining from the user identity a data source and a set of services associated with the data source; and associating the client with the automatically determined data source and services.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1:
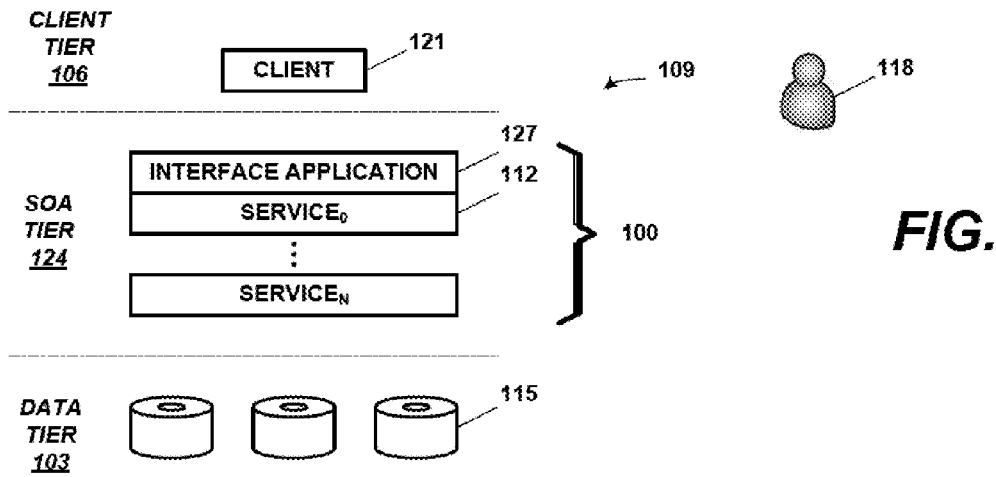
FIG. 1 conceptually illustrates an exemplary computing system in accordance one aspect of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

A service architected logistics solution is presented herein that generates a user interface to a computing system unique for a given user among a multiplicity of users. As shown best in FIG. 1, it generally includes an interface 100 between a data tier 103 and a client tier 106 of a computing system 109. The interface 100 comprises a interface application 127 and a set of services 112 (only one indicated). The services 112 are associated with a data source 115. The particular services 112 and the data source(s) 115 (only one indicated) that the user 118 may access and utilize is automatically determined from the identity of a user 118 of the client 121. This determination is made by the interface application 127 in a manner described more fully below. The interface 100 implements a service oriented architecture ("SOA) tier 124.

The interface application 127 is, as its name implies, an application in the illustrated embodiment. However, those in the art will appreciate that its functionality may be implemented in some other type of software component. For example, in alternative embodiments, the functionality of the interface application 127 may be implemented in a script called by an application or a daemon operating in the background. The more typical implementation, however, will be in a number of software components of different, interacting types. Thus, the technique is not limited by the nature of the software component in which this functionality is implemented.

Similarly, as will also be recognized by those skilled in the art, the number and identity of the services 112 will depend on a number of implementation specific factors. These will include the operating system (not shown) employed by the computing system 109, the implementation and capabilities of the client 121, and the management of permissions for the user 118. This list is neither exhaustive nor exclusive. Other factors may also become apparent to those skilled in the art. Accordingly, the presently disclosed technique is not limited by the number and identity of the services 112 except as otherwise noted herein.

The presently disclosed technique also admits wide variation in the implementation of the data sources 115. It is well known that computing systems frequently include many data sources storing data in different formats and in different structures. The larger the computing system, the more likely this is to be the case. The implementation of the data sources 115 will therefore also be specific to a given embodiment in a manner that will be readily understood by those skilled in the art.

Figure 2:
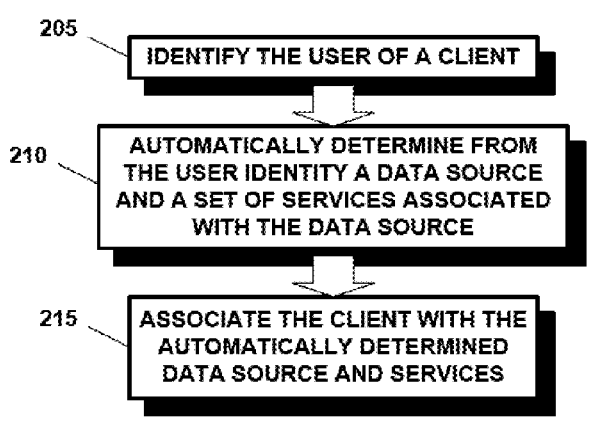
FIG. 2 diagrams a method practiced in accordance with a second aspect of the present invention.
Figure 3:
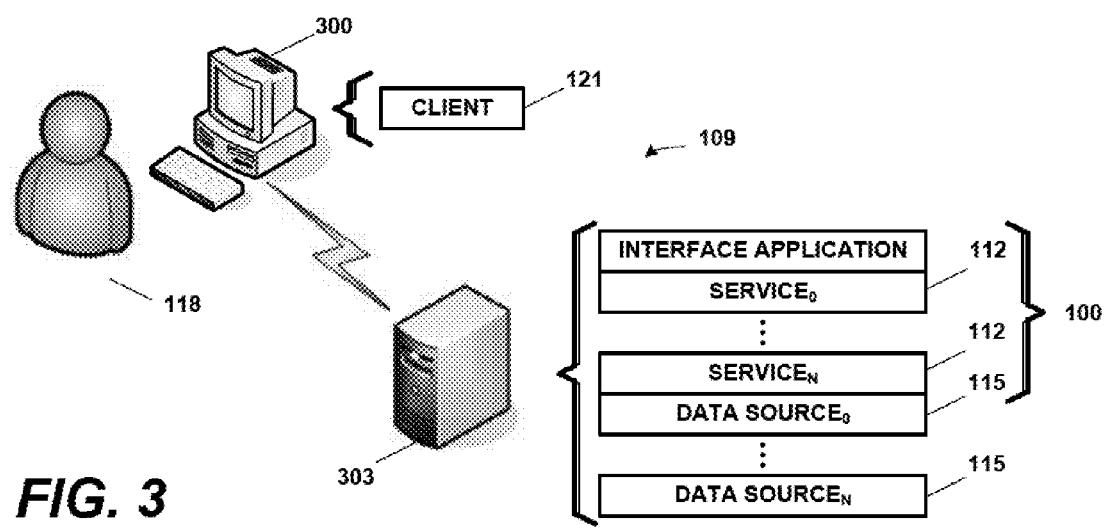
FIG. 3 depicts one implementation of the computing system of FIG. 1.

Referring now to FIG. 1-FIG. 3, the computing system 109 will typically involve multiple computing apparatuses such as the workstation 300 and the server 303. Note that the implementation of individual embodiments in this respect is not material to the practice of the technique. In operation, the technique includes a method 200 for interfacing a data tier 106 and a client tier 103 of a computing system 109, comprising:

identifying (at 205) the user 118 of a client 121;
    automatically determining (at 210) from the user identity a data source 115 and a set of services 112 associated with the data source 115; and
    associating (at 215) the client 121 with the automatically determined data source 115 and services 112.

As will be apparent to those in art having the benefit of this disclosure, some portions of the detailed descriptions herein are consequently presented in terms of a computer implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the computer implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 4:
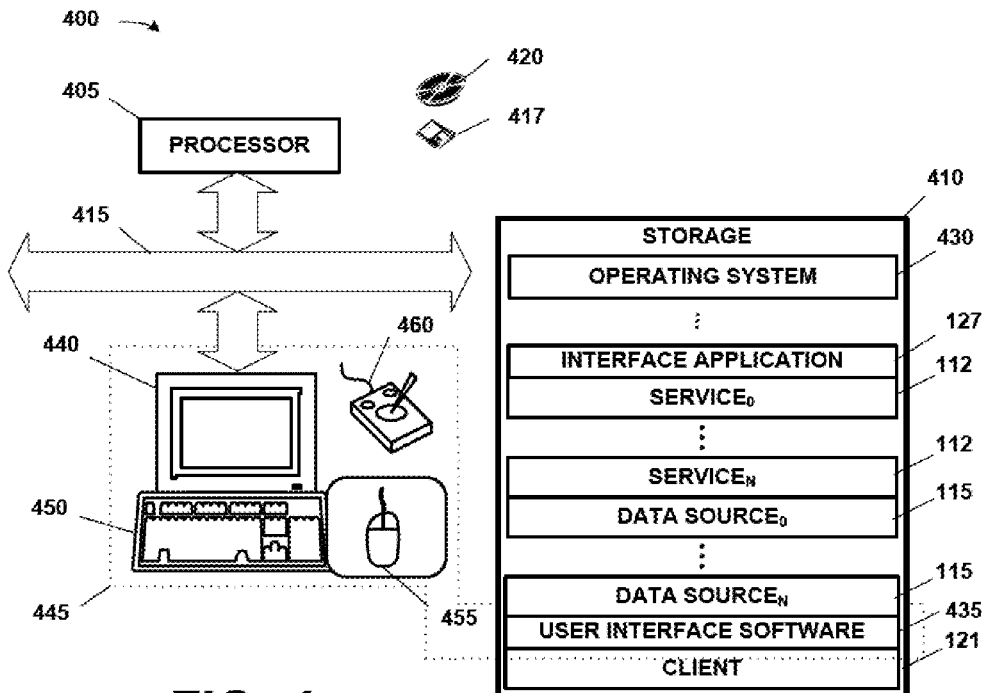
FIG. 4 shows selected portions of the hardware and software architecture of a computing apparatus such as may be employed in some aspects of the present invention.

Accordingly, in one aspect the invention includes a computer-readable, program storage device such as, for example, the optical disk 430 or the magnetic disk 417, shown in FIG. 4. The program storage medium is encoded with instructions that, when executed by a processor, perform the method 200 of FIG. 2 for interfacing a data tier 103 and a client tier 106 of a computing system 109.

Referring now to FIG. 4, the presently disclosed technique admits wide variation in the implementation of the computing system. FIG. 4 shows selected portions of the hardware and software architecture of a computing apparatus 400 such as may be employed in some aspects of the present invention. In general, the computing system comprises: a processor 405; a bus system 415; and a storage 410. The storage 410 may include a hard disk and/or random access memory ("RAM") and/or removable storage such as a floppy magnetic disk 417 and an optical disk 420.

On the storage system resides: a client 121 that may communicate over the bus system 415; a plurality of data sources 115 accessible over the bus system 415; a plurality of services 112 that may be invoked and operate over the bus system 415; and a software component, such as the interface application 127. The interface application 127, when invoked by the processor 405 over the bus system 415, performs the method 200 of FIG. 2. The storage 410 is also encoded with an operating system 430, user interface software 435, and an application 127. The user interface software 435, in conjunction with a display 440, implements a user interface 445. The user interface 445 may include peripheral I/O devices such as a keypad or keyboard 450, a mouse 455, or a joystick 460.

The processor 405 runs under the control of the operating system 430, which may be practically any operating system known to the art. The application 127 is invoked by the operating system 430 upon power up, reset, or both, depending on the implementation of the operating system 430. The interface application 127, when invoked, performs the method of the present invention. The user may invoke the application in conventional fashion through the user interface 445.

Figure 5:
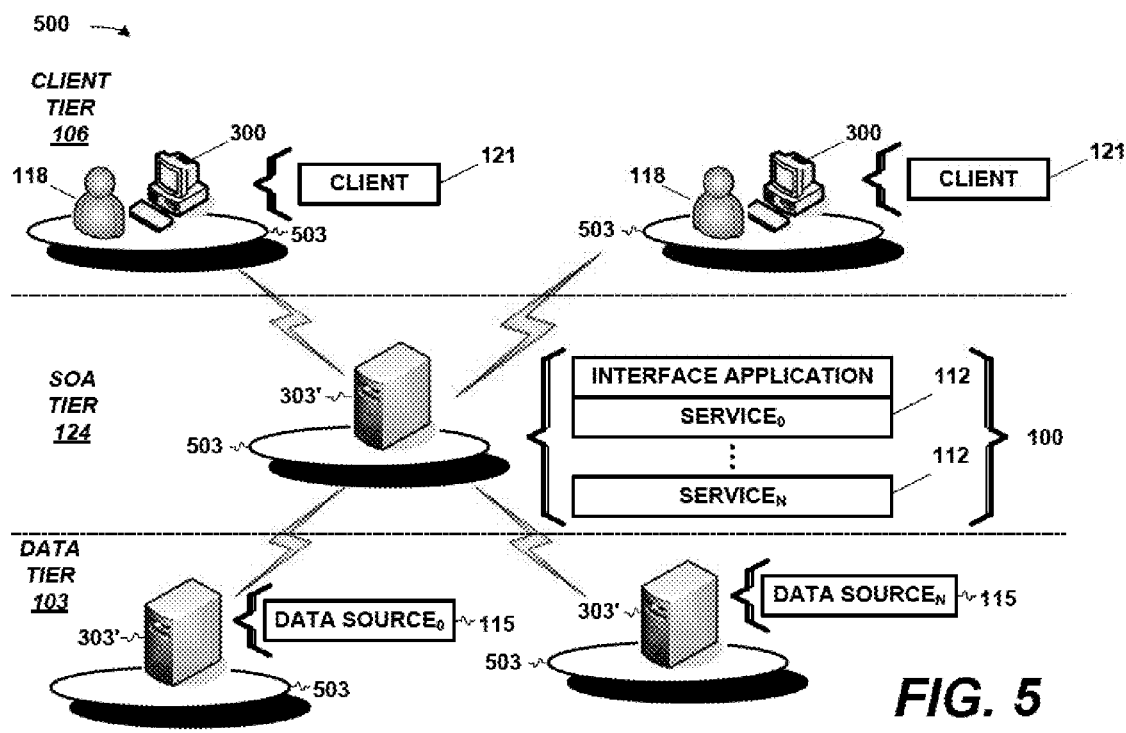
FIG. 5 depicts a second implementation of the computing system of FIG. 1.

Although the invention may be employed on a computing system comprising a single computing apparatus, the invention is not limited in this manner. The embodiment of FIG. 3, for example comprises two computing apparatuses. Indeed, as noted above, the computing system will typically include many computing apparatuses in many locations. Some embodiments of the present invention may therefore be implemented on a computing system, e.g., the computing system 500 of FIG. 5.

For example, the data sources 115 may reside in data structure residing on server 303' of the data tier 103, the interface application 127 and services 112, and the client 121 on workstations 300, each of which is in a different location 503. The computing system 500 employs a networked client/server architecture. However, there is no requirement that the computing system 500 be networked. Alternative embodiments may employ, for instance, a peer-to-peer architecture or some hybrid of a peer-to-peer and client/server architecture. The size and geographic scope of the computing system 500 is not material to the practice of the presently disclosed technique. The size and scope may range anywhere from just a few machines of a Local Area Network ("LAN") located in the same room to many hundreds or thousands of machines globally distributed in an enterprise computing system.

Figure 6:
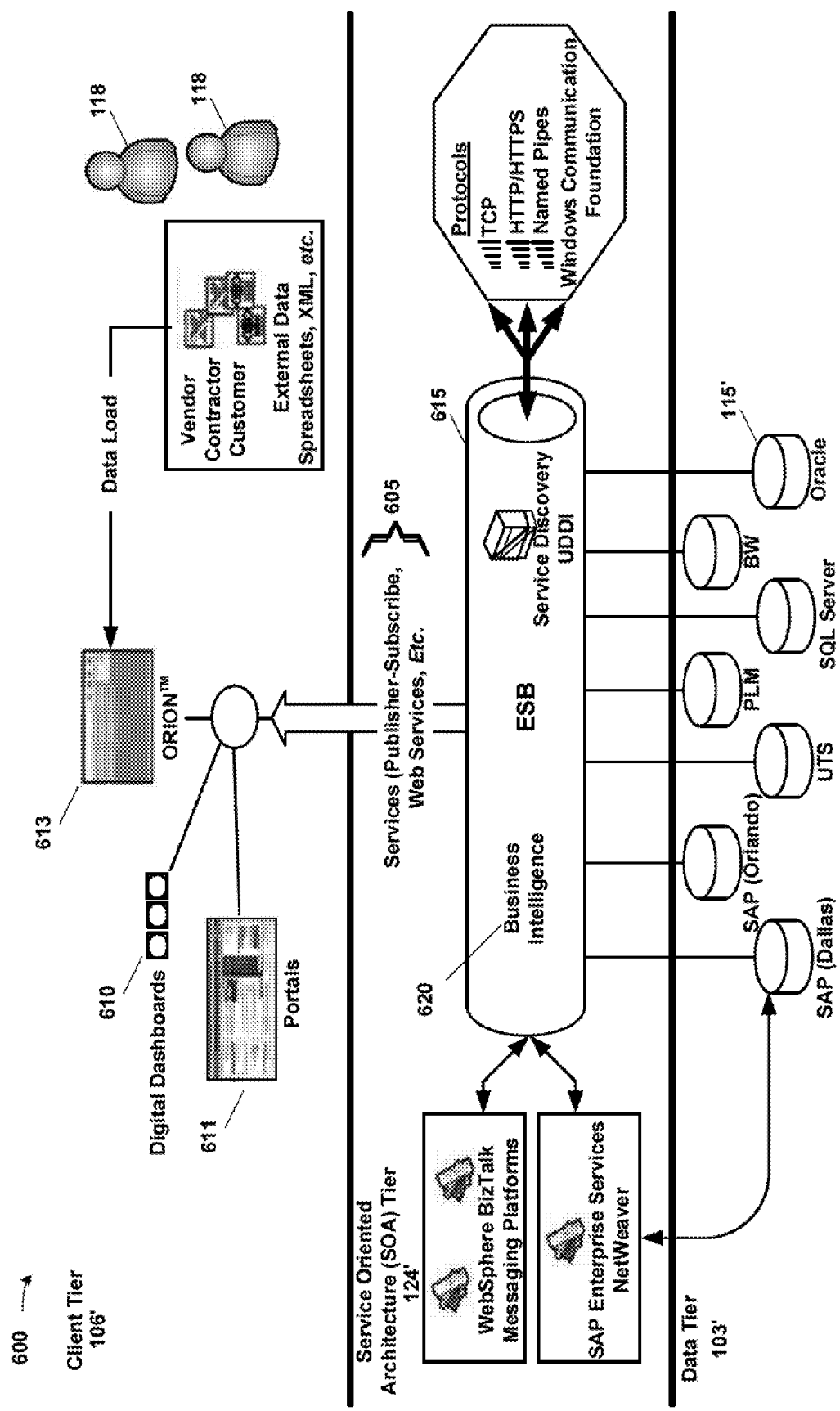
FIG. 6-FIG. 7 conceptually illustrate one particular implementation of one particular embodiment.
Figure 7:
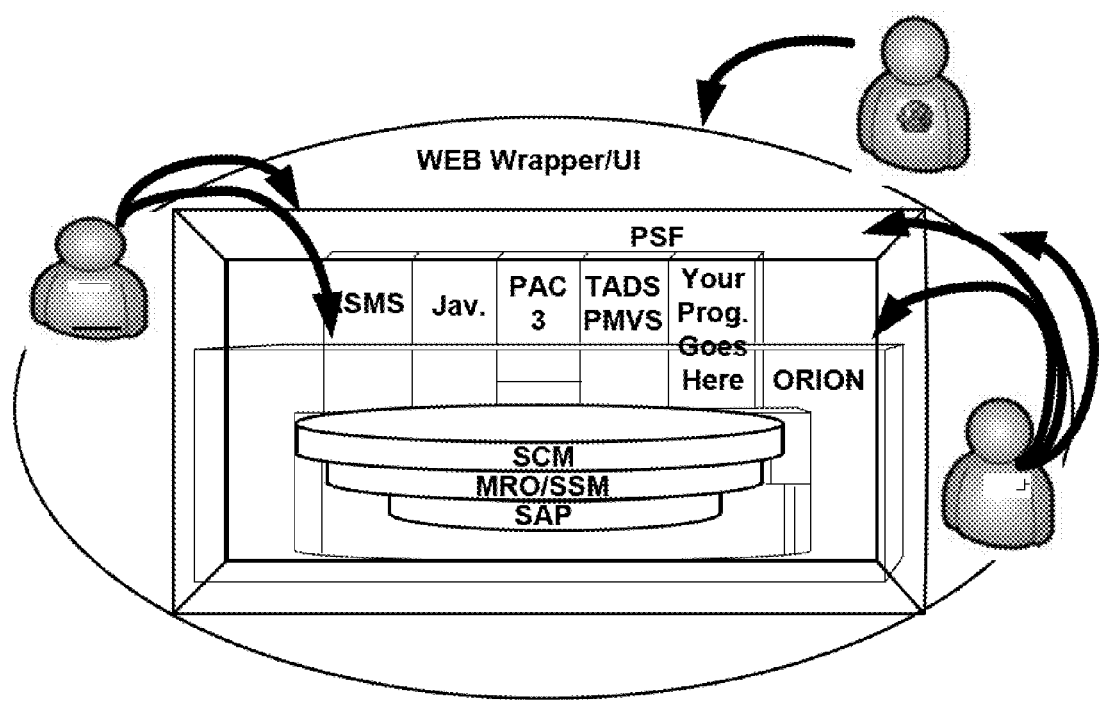

In one particular embodiment, known as "OASAS", the client tier may be implemented in a PAC-3 missile platform. FIG. 6-FIG. 7 illustrate one particular implementation 600 of this embodiment. In this particular embodiment, known as "OASAS", the client tier 106' may be implemented in a PAC-3 missile platform. Presently, the PAC-3 missile platform utilizes a logistics application known as ORION™. The ORION™ application will be enhanced in accordance with the present invention to become a service oriented architecture. Through the development of a set of services 605 (e.g., business processes) in the SOA tier 124' and the publication of these services via an enterprise service bus ("ESB") 615, while maintaining current web service standards (WS*), OASAS will become a SOA capable of direct data exchange with other defense agency SOAs (not shown).

Figure 8A:
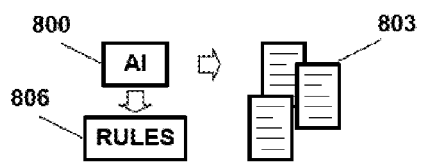
FIG. 8A-FIG. 8B illustrate two alternative mechanisms employed by the embodiment of FIG. 6-FIG. 7

The Service Oriented Architecture ("SOA") facilitates an agile holistic approach for product logistics and sustainment. The OASAS SOA solution offers a unique program/product interface methodology through a "business intelligence" 620 comprising an artificial intelligence 800 ("AI"), shown in FIG. 8A, and master data pages 803. The master data pages 803 are templates that provide a standard look and feel, as well as, customizable functionality across all, or selected pages of a .NET application. OASAS uses master data pages 803 to customize the look and feel of the application for individual programs which reduces the time required for a program to come on line, as well as, providing an enhanced user experience. Master pages are defined by program and the roles associated within each program (Admin, Mgr, Individual Contributor, etc.).

Figure 8B:
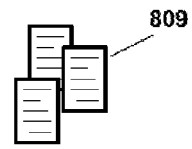

The artificial intelligence 800 establishes the inference rules 806 which eliminate the need for product specific coding/development for each product requiring logistics/sustainment capabilities. Note that alternative embodiments may employ one or more lookup tables such as the lookup tables 809 shown in FIG. 8B. The lookup tables 809 are where customized meta-data may be accessed. OASAS integrates a dynamic user interface by reading customizations from the lookup tables 809 to determine the user experience, available functionality, etc. This allows rapid changes to program specific implementations by updating data rather than having to code logic into the application. The artificial intelligence 800 comprises an inference engine that utilizes "rules"—i.e., the inference rules 806—to determine how a business process is executed rather than coding the logic into the application itself. These rules are designed to be created by the SME (Subject Matter Expert) and entered into the .NET application as data, this does not require programming expertise. Rules can be created, modified or deleted real time to publish new business logic as it becomes available.

As individual users 118 sign into the system 600, OASAS understands, based on identification and authorization (e.g., password), which user 118 is accessing the system 600, what services 605 should be rendered, and what data stores 115' (only one indicated) in the data tier 103' are required for that user 118. This methodology creates a unique user interface to the central data repository/warehouse (i.e., the data stores 115') for logistics information. This becomes useful given a multiplicity of users 118 and a diversity of access methodologies, such as portals 610, the digital dashboards 612, and/or the ORION™ GUI 613, for example.

When establishing a SOA, the service portion of the SOA is equivalent to the business process, or the function a business performs. The business process management ("BPM") and the subsequent business process rules ("BPR") associated with those BPM's are established. Data stores are then defined and made dependent on the business rules defined. The artificial intelligence portion of code will reference the correct data store based upon the user's credentials, program/product orientation, revision of service required.

The implementation of this application architecture is accomplished with a combination of the following information technology ("IT") toolsets known to the art:
.NET Managed Code
Database Stored Procedures
Custom Web Services
Service Advertising Protocol ("SAP") Web Services
External Web Services
External Open DataBase Connectivity ("ODBC") Accessible Systems Deployment packages are defined to facilitate integration and installation processes. To assist the implementation of the application architecture deployment packages (i.e., Installation Guidelines) are defined to facilitate integration and installation processes.

The graphical user interface ("GUI") 613 is a .NET web application integrated with Data Stores 115' (i.e., SAP, Oracle, Structured Query Language ("SQL") Server) which is data driven and does not require additional customized programming. User administrators (not shown) can manipulate the end user 118 experience via simple data modifications without having to change the code within the application itself, therefore avoiding recompilation and deployment of code revisions.

OASAS is a unique SOA that works across a multitude of product sustainment platforms offering users a product specific interface while simultaneously integrating a holistic approach to logistic operations. OASAS offers administrative users the ability to customize without the need to become code developers. OASAS offers the end users agility to work with specific product interfaces without having to re-learn new systems and solutions.

The following acronyms are used throughout this disclosure:

TABLE 1

List of Acronyms

| Acronym | Definition |
| --- | --- |
| OASAS | Logistics Application |
| SALE | Single Army Logistics Enterprise |
| LMP | Logistics Modernization Program |
| PSF | Product Support Framework |
| PAC | Patriot Advanced Capability |
| ERP | Enterprise Relationship Planning |
| MRO | Maintenance Repair and Overhaul |
| SAP | Systems Application and Programs |
| AADMIS | United Arab Emerites ERP |
| MAXIMO | IBM's ERP Environment |
| ESB | Enterprise Service Bus |
| AGMS | Air to Ground Missile Systems |
| TADS | Tactical Air Defense System |
| PNVS | Peripheral Night Vision System |
| ORION | PAC-3 Logistics System |
| SCM | Supply Chain Management |
| MRO | Maintenance Repair and Overhaul |
| SSM | SAP Strategy Management |
| SAP | Systems Application and Programs |
| SOA | Service Oriented Architecture |

In the description and the claims hereof, the phrase "capable of" is sometimes used. The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them— i.e., when there is no power or when they are powered but not in operation.

This concludes the detailed description. The particular embodiments disclosed above are illustrative only, as the disclosed technique may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An interface between a data tier and a client tier of a computing system, comprising:
   an interface software component; and
   a set of services associated with a data source in the data tier, the services and data source being automatically determined at runtime for a user of the client tier by the interface component from the user's identity;
   wherein the interface software component includes:
      a plurality of master data pages; and
      an artificial intelligence, including:
         a rules base; and
         an inferencing engine capable operating on the rules base to perform the automatic determination.

2. The interface of claim 1, wherein the interface software component includes a plurality of lookup tables.

3. The interface of claim 1, wherein the interface comprises a service oriented architecture.

4. The interface of claim 1, wherein the user interacts through the plurality of master data pages.

5. A computer-implemented method for interfacing a data tier and a client tier of a computing system, comprising:
   identifying the user of a client;
   automatically determining from the user identity a data source and a set of services associated with the data source, including inferencing on a plurality of rules to determine the data source and services; and
   associating the client with the automatically determined data source and services.

6. The computer-implemented method of claim 5, wherein the automatic determination includes consulting a look-up table to determine the data source and services.

7. A computer-readable, program storage device encoded with instructions that, when executed by a processor, perform a method for interfacing a data tier and a client tier of a computing system, the method comprising:
   identifying the user of a client;
   automatically determining at runtime from the user identity a data source and a set of services associated with the data source, including inferencing on a plurality of rules to determine the data source and services; and
   associating the client with the automatically determined data source and services.

8. The computer-readable, program storage device of claim 7, wherein the automatic determination includes consulting a look-up table to determine the data source and services.

9. A computing system, comprising:
   a processor;
   a bus system;
   a storage, in which resides:
      a client that may communicate over the bus system;
      a plurality of data sources accessible over the bus system;
      a plurality of services that may be invoked and operate over the bus system; and
      an interface software component that, when invoked by the processor over the bus system, performs a method including:
         identifying the user of a client;
         automatically determining at runtime from the user identity a data source and a set of services associated with the data source; and
         associating the client with the automatically determined data source and services;

wherein the interface software component includes:
a plurality of master data pages; and
an artificial intelligence, including:
a rules base; and
an inferencing engine capable operating on the rules base to perform the automatic determination.

10. The computing system of claim 9, wherein the interface software component includes:
an interface component; and
a set of services associated with a data source in the data tier, the services and data source being automatically determined for a user of the client tier by the interface component from the user's identity.

11. The computing system of claim 9, wherein the interface software component further includes a plurality of lookup tables.

12. The computing system of claim 9, wherein the automatic determination includes consulting a look-up table to determine the data source and services.

13. A computing system, comprising:
a plurality of data sources;
a plurality of clients;
a plurality of services; and
an interface between the data sources and the clients capable of:
identifying the user of a client;
automatically determining at runtime from the user identity a data source and a set of services associated with the data source; and
associating the client with the automatically determined data source and services;
wherein the interface software component includes:
a plurality of master data pages; and
an artificial intelligence, including:
a rules base; and
an inferencing engine capable operating on the rules base to perform the automatic determination.

14. The computing system of claim 13, wherein the interface includes a set of services associated with a data source in the data tier, the services and data source being automatically determined for a user of the client tier by the interface component from the user's identity.

15. The computing system of claim 13, wherein the interface further includes:
a plurality of master data pages; and
a plurality of lookup tables.

16. The computing system of claim 13, wherein the automatic determination includes consulting a look-up table to determine the data source and services.

17. An interface between a data tier and a client tier of a computing system, comprising:
an interface software component, wherein the interface software component includes:
a plurality of master data pages; and
a plurality of lookup tables; and
a set of services associated with a data source in the data tier, the services and data source being automatically determined at runtime for a user of the client tier by the interface component from the user's identity.

18. The interface of claim 17, wherein the interface comprises a service oriented architecture.

19. The interface of claim 17, wherein the interface software component comprises a plurality of master data pages through which the user interacts.

20. An interface between a data tier and a client tier of a computing system, comprising:
an interface software component comprising a plurality of master data pages through which the user interacts; and
a set of services associated with a data source in the data tier, the services and data source being automatically determined at runtime for a user of the client tier by the interface component from the user's identity.

21. The interface of claim 20, wherein the interface software component includes a plurality of lookup tables.

22. The interface of claim 20, wherein the interface comprises a service oriented architecture.

23. A computer-implemented method for interfacing a data tier and a client tier of a computing system, comprising:
identifying the user of a client;
automatically determining from the user identity a data source and a set of services associated with the data source, including consulting a look-up table to determine the data source and services; and
associating the client with the automatically determined data source and services.

24. A computer-readable, program storage device encoded with instructions that, when executed by a processor, perform a method for interfacing a data tier and a client tier of a computing system, the method comprising:
identifying the user of a client;
automatically determining at runtime from the user identity a data source and a set of services associated with the data source, including consulting a look-up table to determine the data source and services; and
associating the client with the automatically determined data source and services.

25. A computing system, comprising:
a processor;
a bus system;
a storage, in which resides:
a client that may communicate over the bus system;
a plurality of data sources accessible over the bus system;
a plurality of services that may be invoked and operate over the bus system; and
an interface software component including:
a plurality of master data pages; and
a plurality of lookup tables;
wherein the interface software component, upon invocation by the processor over the bus system, performs a method including:
identifying the user of a client;
automatically determining at runtime from the user identity a data source and a set of services associated with the data source; and
associating the client with the automatically determined data source and services.

26. The computing system of claim 25, wherein the interface software component includes:
an interface component; and
a set of services associated with a data source in the data tier, the services and data source being automatically determined for a user of the client tier by the interface component from the user's identity.

27. The computing system of claim 25, wherein the automatic determination includes inferencing on a plurality of rules to determine the data source and services.

28. The computing system of claim 25, wherein the automatic determination includes consulting a look-up table to determine the data source and services.

29. A computing system, comprising:
a processor;
a bus system;
a storage, in which resides:
  a client that may communicate over the bus system;
  a plurality of data sources accessible over the bus system;
  a plurality of services that may be invoked and operate over the bus system; and
  an interface software component that, when invoked by the processor over the bus system, performs a method including:
    identifying the user of a client;
    automatically determining at runtime from the user identity a data source and a set of services associated with the data source, including inferencing on a plurality of rules to determine the data source and services; and
    associating the client with the automatically determined data source and services.

30. The computing system of claim 29, wherein the interface software component includes:
an interface component; and
a set of services associated with a data source in the data tier, the services and data source being automatically determined for a user of the client tier by the interface component from the user's identity.

31. The computing system of claim 29, wherein the interface software component further includes:
a plurality of master data pages; and
a plurality of lookup tables.

32. The computing system of claim 29, wherein the automatic determination includes consulting a look-up table to determine the data source and services.

33. A computing system, comprising:
a processor;
a bus system;
a storage, in which resides:
  a client that may communicate over the bus system;
  a plurality of data sources accessible over the bus system;
  a plurality of services that may be invoked and operate over the bus system; and
  an interface software component that, when invoked by the processor over the bus system, performs a method including:
    identifying the user of a client;
    automatically deter mining at runtime from the user identity a data source and a set of services associated with the data source, including consulting a look-up table to determine the data source and services; and
    associating the client with the automatically determined data source and services.

34. The computing system of claim 33, wherein the interface software component includes:
an interface component; and
a set of services associated with a data source in the data tier, the services and data source being automatically determined for a user of the client tier by the interface component from the user's identity.

35. The computing system of claim 33, wherein the interface software component further includes:
a plurality of master data pages; and
a plurality of lookup tables.

36. The computing system of claim 33, wherein the automatic determination includes inferencing on a plurality of rules to determine the data source and services.

37. A computing system, comprising:
a plurality of data sources;
a plurality of clients;
a plurality of services; and
an interface between the data sources and the clients including:
  a plurality of master data pages; and
  a plurality of lookup tables; and
  capable of:
    identifying the user of a client;
    automatically determining at runtime from the user identity a data source and a set of services associated with the data source; and
    associating the client with the automatically determined data source and services.

38. The computing system of claim 37, wherein the interface includes:
an interface component; and
a set of services associated with a data source in the data tier, the services and data source being automatically determined for a user of the client tier by the interface component from the user's identity.

39. The computing system of claim 37, wherein the automatic determination includes inferencing on a plurality of rules to determine the data source and services.

40. The computing system of claim 37, wherein the automatic determination includes consulting a look-up table to determine the data source and services.

41. A computing system, comprising:
a plurality of data sources;
a plurality of clients;
a plurality of services; and
an interface between the data sources and the clients capable of:
  identifying the user of a client;
  automatically determining at runtime from the user identity a data source and a set of services associated with the data source, including inferencing on a plurality of rules to determine the data source and services; and
  associating the client with the automatically determined data source and services.

42. The computing system of claim 41, wherein the interface includes:
an interface component; and
a set of services associated with a data source in the data tier, the services and data source being automatically determined for a user of the client tier by the interface component from the user's identity.

43. The computing system of claim 41, wherein the interface further includes:
a plurality of master data pages; and
a plurality of lookup tables.

44. The computing system of claim 41, wherein the automatic determination includes consulting a look-up table to determine the data source and services.

45. A computing system, comprising:
a plurality of data sources;
a plurality of clients;
a plurality of services; and
an interface between the data sources and the clients capable of:
  identifying the user of a client;

automatically determining at runtime from the user identity a data source and a set of services associated with the data source, including consulting a look-up table to determine the data source and services; and associating the client with the automatically determined data source and services.

46. The computing system of claim 45, wherein the interface includes:

an interface component; and a set of services associated with a data source in the data tier, the services and data source being automatically determined for a user of the client tier by the interface component from the user's identity.

47. The computing system of claim 45, wherein the interface further includes:

a plurality of master data pages; and a plurality of lookup tables.

48. The computing system of claim 45, wherein the automatic determination includes inferencing on a plurality of rules to determine the data source and services.

* * * * *